April 2, 1940.  P. H. LYNCH, SR  2,195,703
SEED PLANTER
Filed Jan. 24, 1939  2 Sheets-Sheet 2
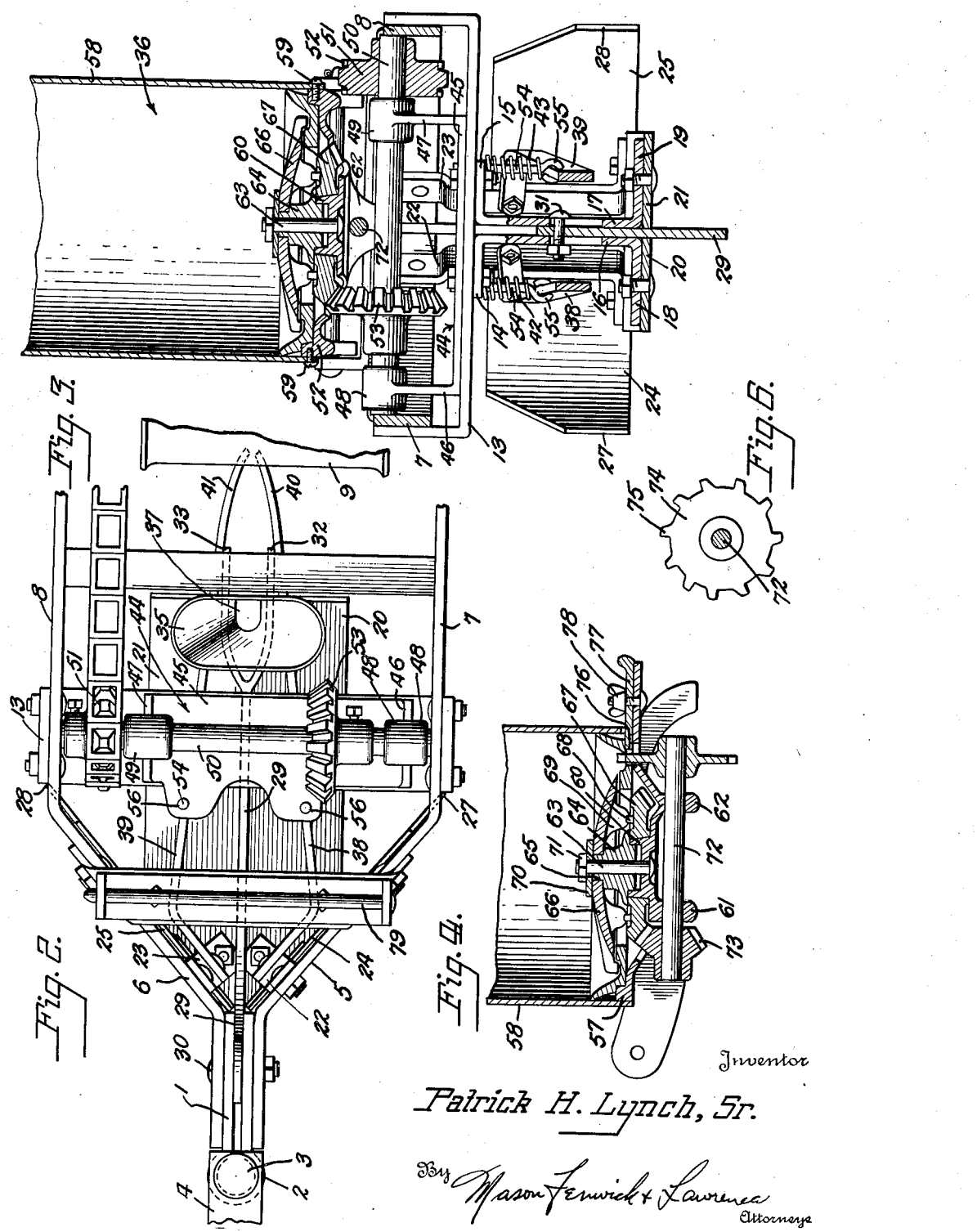
Inventor
Patrick H. Lynch, Sr.
By Mason Fenwick & Lawrence
Attorneys Patented Apr. 2, 1940

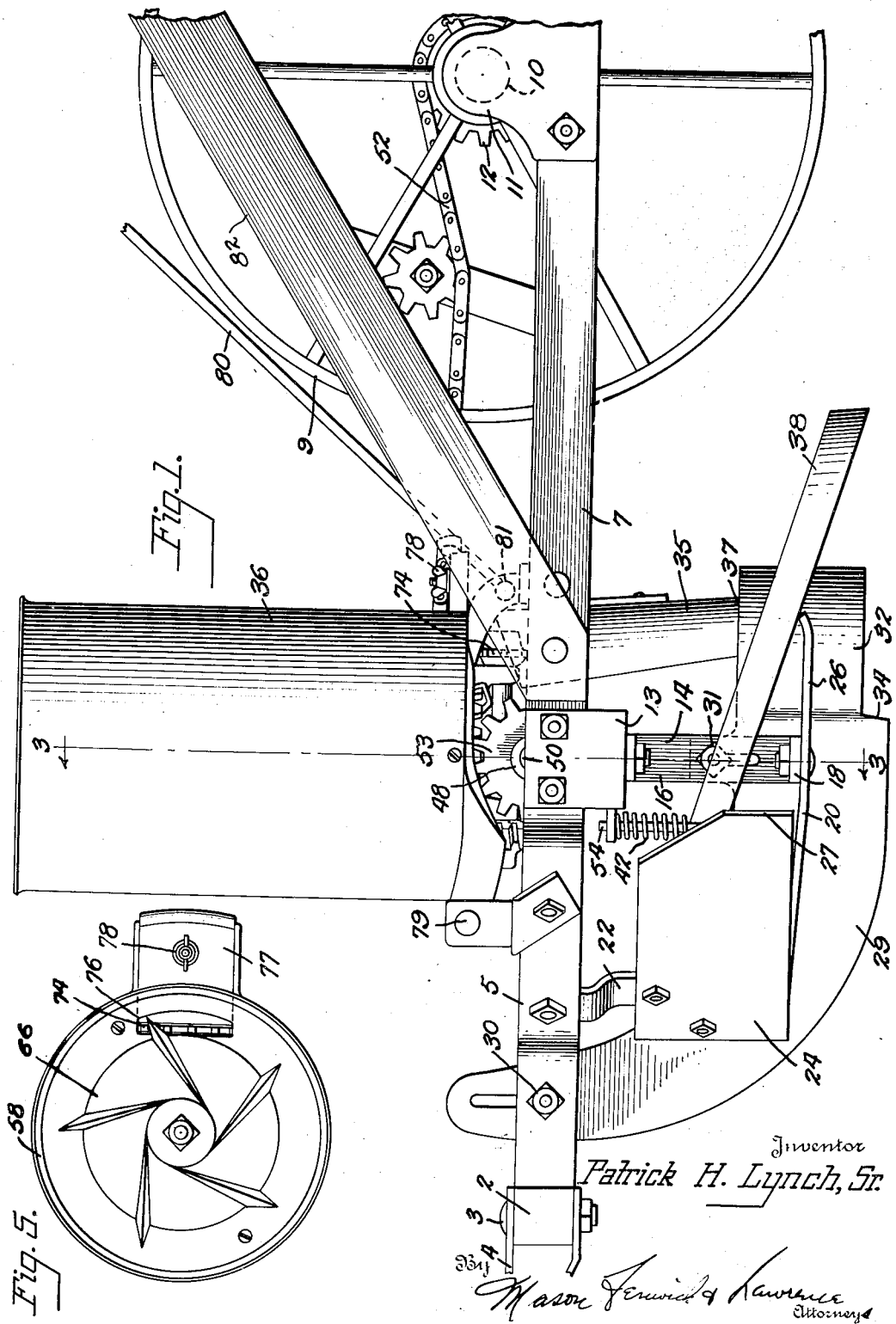

2,195,703

UNITED STATES PATENT OFFICE 2,195,703

SEED PLANTER

Patrick H. Lynch, Sr., Dunn, N. C., assignor to The John A. McKay Manufacturing Company, Dunn, N. C., a corporation of North Carolina Application January 24, 1939, Serial No. 252,652

1 Claim. (Cl. 111—52)

This invention relates to planters. It is a continuation-in-part of my pending application, Ser. No. 155,085, filed July 22, 1937, and in part it is an improvement upon the structure disclosed in said pending application.

The object of this invention is to provide for the making of a continuous furrow even when the course of the furrow is so devious as to require a pivotal shifting of the planter relative to the ground, in a traction operated planter of the type, the functions of which are performed in a prepared bed of soft soil by soil engaging instrumentalities including a soil penetrating furrow guide; furrow opening means, a seed spout and furrow closing means arranged sequentially close behind said furrow guide and occupying an intermediate position with respect to forward, rearward and lateral soil engaging means, by disposing the preponderant weight of said planter including the seed distributing hopper and the power transmission mechanism therefor, directly above that portion of the furrow guide which is immediately forward of the furrow opening means so that notwithstanding the fact that the planter is in contact with the ground at points forward as well as rearward of said guide, it will pivot about the preponderant weighted portion of said guide when the direction of orientation of the planter is changed.

Other objects of the invention will appear as the following description of a preferred and practical embodiment thereof proceeds.

In the drawings which accompany and form a part of the following specification, and throughout the several figures of which the same characters of reference have been employed to denote identical parts:

Figure 1 is a side elevation of a planter embodying the features of the present invention, portions being omitted;

Figure 2 is a plan view, parts being broken away;

Figure 3 is a section taken along the line 3—3 of Figure 1;

Figure 4 is an axial section in detail through the lower portion of the hopper showing the intergeared mechanism;

Figure 5 is a plan view of the hopper; and

Figure 6 is a side elevation of the picker wheel.

Referring now in detail to the several figures, the frame of the planter is constituted at the front by a U-shaped flat bar 1, the bight 2 of which forms an eye for the reception of the bolt 3 to which the hitch or clevis 4 is pivotally connected to the planter. To the outside of the limbs of the U-shaped member, the side frame bars 5 and 6 are connected. These bars diverge at the forward part of the frame and then extend spaced and parallel to the rear of the apparatus, forming the wide frame members 7 and 8. A traction wheel 9 supports the frame toward the rear, said traction wheel being mounted fixedly upon an axle 10, which bridges the frame members 7 and 8, and has its ends journaled in suitable bearings 11 bolted to said frame members. A sprocket 12 is fixed to the axle 10, and receives power through said axle from said traction wheel. Just rearwardly of the divergent portion of the frame, and bolted to the forward portions of parallel frame members 7 and 8, is the bridge bar 13, this being a flat member of sturdy proportions. On the under side of this bridge bar, angular supports 14 and 15 are bolted, having vertical limbs 16 and 17 spaced apart. The lower ends 18 and 19 of said angular supports are turned outwardly, to which ends the skids 20 and 21 are suitably secured. Straps 22 and 23 depend from the forward divergent limbs of the frame, to which are bolted the wings or deflecting plates 24 and 25.

The bottom edges 26 of the wings 24 and 25, the skids 20 and 21, and the bottom of the traction wheel are approximately in a single plane, being the level of the ground on which the planter rests. It is to be understood, of course, that the planter is to be employed upon a prepared field or plot of ground which is in a soft condition, so that the weight of the planter will cause the lower edges of the wings 24 to sink beneath the surface of the ground. When the planter is drawn forwardly, the wings 24 and 25 push aside a light top layer of the ground, including the small lumps and clods which may have dried in the sun, thus clearing a continuous strip having a width equal to the distance apart of the rear edges 27 and 28 of the wings 24 and 25, thus exposing the underlying softer and more friable portion of the ground. This strip is at a slightly lower level than that of the field, and the skids as well as the traction wheel, rest upon this depressed area.

A keel or runner 29 has its front portion slidably mounted between the limbs of the U-shaped bar 1, and has an intermediate portion adjustably mounted between the spaced vertical limbs 16 and 17 of the angular supports 14 and 15. The keel extends downwardly between the skids 20 and 21, and is adjustable depthwise by means of bolt and slot connections, represented generally by the reference characters 30 and 31 with the spaced elements of the U-shaped bar 1 and the angular supports 14 and 15.

The keel or runner 29 is made of a relatively thin piece of material which is bifurcated or expanded at its rear end, forming divergent portions 32 and 33, the functions of which divergent portions is to spread the ground and form the seed furrow. It will be understood that the lower surface of the skids 20 and 21, as shown in Figures 1 and 3, rests upon the surface of the ground in the cleared strip traversed by the planter, and that the divergent portions 32 and 33 extend below the level of said skids. The amount by which the divergent portions of the runner extend beneath the skids determines the depth of the said furrow, and this depth may be adjustably changed by lowering or raising the runner through the instrumentality of the bolt and slot connections.

It will be observed in Figure 1 that the runner has a portion 34 extending below the level of the divergent portions 32 and 33. This lowermost portion of the runner cuts for itself a narrow guiding groove beneath the bottom of the seed furrow, which keeps the planter in median alignment with the cleared strip which the planter traverses, producing a furrow of longitudinally smooth curvature without any lateral uncertainty or waviness. If no portion of the runner 29 extended below the level of the bottom of the seed furrow, the runner would not be positively guided, but would be subject to side sway within the limits of the width of the furrow.

A seed spout 35 which leads from a seed hopper 36 has its discharge end 37 (see Figure 2), between the divergent portions of the runner 29. Furrow closing arms 38 and 39 are provided, pivoted at their forward ends to the strips 22, and extending rearwardly, having inwardly curved ends 40 and 41 at the rear of the divergent portions 32 and 33 of the runner 29. The furrow closing arms in the position in which they are shown in Figure 1 are resting by gravity against the ends of the skids, but this is an abnormal position, as when the planter is resting upon the ground, the ends of the closing arms will also rest upon the ground, being no lower than the bottoms of the skids 20 and 21, and generally resting higher upon the earth which has been pushed out to the sides of the furrow by the divergent portions of the runner. When in this normal elevated position, the closing arms press upwardly against the coil springs 42 and 43. Thus, the closing arms are in spring pressed relation to the contour of the immediate sides of the seed furrow, and accommodate themselves to vertical irregularities in said contour. It will be observed from Figure 2 that the only portion of the furrow open at any one time is that part which underlies the oval defined by the divergent portions 32 and 33 of the runner, and the inwardly curved ends 40 and 41 of the closing members. Thus the seed, even if light, have no chance to be blown away.

To the rear of the closing arms is the traction wheel 9, which is in the main flat in its widthwise direction, and serves to compact the soil of the covered furrow. The usual lifting and guiding handles, one of which, 82, is shown in Figure 1, are fixed to the side frame members and extend rearwardly and upwardly of the traction wheel. While in the conventional planters, the lifting function of the handles is to raise the earth manipulating instrumentalities from the ground about the traction wheel as a fulcrum, for ease in turning, in the subject invention the free ends of the handles are lifted, elevating the traction wheel so that the planter turns about the furrow forming element having the deepest penetration so that the planter tracks with the furrow.

From what has been described, it will be readily understood that the planter clears for itself a continuous strip of soil free from the dried out surface clods, and that the lower edges of the wings 24 and 25, the lower surfaces of the skids 20 and 21, and the lower side of the traction wheel rest upon the exposed surface of this strip. It will be understood also, that the skids by the weight of that part of the apparatus which is above them, press and mash out the soft lumps of that part of the soil which they overlie, and which is to immediately become the sides of the furrow; that the divergent portions of the runner push the soil away laterally on both sides to the depth to which said divergent portions are set below the skids, thus forming the furrow; that the seed is dropped in the furrow, and that the closing arms immediately throw the displaced soil back into the furrow, filling the same, and that the soil is then packed by the passage of the traction wheel over the furrow. It will also be understood that during all of this correlated operation, the lowermost portion of the skid has cut for itself a guiding groove in the middle of the furrow, which groove assures a longitudinal smoothness of the furrow. The balancing of the preponderant portion of the weight of the planter above this downwardly extending portion of the runner assures that the planter will track in the seed furrow when turning sharp curves. This is best accomplished by lifting the traction wheel sufficiently to relieve its pressure against the ground during the turning operation.

The bridge bar 13 carries a detachable transmission unit which as a whole is indicated by the reference character 44, and which comprises a bed plate 45 bolted to said bridge bar, and having upstanding lugs 46 and 47, which carry journals 48 and 49 for the gear shaft 50. Said gear shaft has a sprocket 51 at one side, to which power is communicated from the sprocket 12 of the traction wheel through the intermediary of a chain 52. The shaft 50 also carries a bevel gear adapted to transmit power to the gearing of the hopper.

Inasmuch as the coil springs 42 and 43 are compression springs, it is necessary to mount them upon a stem to prevent them buckling in a sidewise direction. It will be observed from Figures 1 and 3 that each of these springs surrounds a stem 54, having an eye 55 which freely engages the closing arms 38 and 39 through holes formed in said arms, and that said stems extend upwardly freely through holes 56 in the bed plate 45 of the transmission unit. Said bed plate forms an abutment for the springs. There is thus, a cooperative relationship between the closure members and the transmission unit. When it is desired to remove the transmission unit for any purpose, as for replacement or repair, this is done by the simple act of undoing the bolts which secure the bed plate of the transmission unit to the bridge bar. The transmission unit is then removable without the necessity of unsecuring the springs or the stems 54 with which they are associated. On the other hand, if a spring should break, its replacement is readily effected simply by loosening the bolts which attach the bed plate to the bridge bar sufficiently to raise the bed plate enough to let the stems drop out of the holes 56. A new spring may then be placed upon the stem, the stems reintroduced into the holes, and the bed plate tightened. This simple construction has an appeal to agriculturists who have only small mechanical ability, since it involves nothing more than the obvious use of an ordinary monkey wrench.

Now, adverting to the hopper, it consists preferably of a cast bottom 57, having roll sheet metal sides 58, suitably attached thereto as by the screws 59. The cast bottom has an upstanding boss 60 in the middle, and downwardly extending lugs 61 and 62. A bolt 63 extends upwardly through the boss 60, upon which a central support 64 is freely mounted, the upper part of said support having a rabbet 65 forming a bearing for rotary seed plate 66. As is customary in planter hoppers of this type, the rabbet 65 and the hole in the seed plate which surrounds said rabbet are polygonal, so as to prevent relative rotation. The central boss 60 provides a bearing surface for a gear 67, which has on its upper surface the upstanding lugs 68 which abut the downwardly extending lugs 69 on the lower face of the seed plate communicating rotation from the gear 67 to the seed plate. In assembling, the mechanism which is carried by the bottom of the hopper at the gear 67 is first placed upon the boss 60; then the support 64 is put in place; next, the seed plate is placed upon the support; then the bolt 63 is introduced through the boss 60 and the support 64; and finally, the retaining washer 70 and the nut 71 are put in place.

A shaft 72 is journaled in the lugs 61 and 62, having on one end a bevel gear 73 which meshes with the bevel 67 through a suitable opening in the bottom of the hopper. The opposite end of the shaft 72 carries a picker wheel 74, which is shown in detail in Figure 6, being provided with spaced teeth 75. Figure 4 shows that the picker wheel extends through a slot 76 in the bottom of the hopper, forming a gate for said slot, and that the teeth 75 function as distributing means for the seed, which are continuously pushed toward the periphery of the bottom of the hopper by the seed plate 66. The picker wheel 74 in its rotation, drops the seed one at a time at intervals determined by the spacing of the teeth 75. Figure 4 also shows that the width of the slot may be regulated by adjusting a sliding plate 77 which is held in any desired position by means, such as the thumb nut 78. The hopper is tiltably mounted upon a rod 79. When it is in normal operating position, with its axis perpendicular, or substantially so, to the frame of the machine, the gear 53 of the transmission unit is in mesh with the gear 67 of the hopper through a suitable opening in bottom of the latter, as clearly shown in Figure 3. Thus, power is transmitted from the transmission unit through the gear 67, both to the seed plate 66 and the picker wheel 74. Means is provided, such for example, as the rod or wire 80, the end of which is connected through a hole 81 with the bottom of the hopper opposite its hinged connection, so that pulling upon the rod or wire, the hopper can be tilted and the gears 53 and 67 moved out of mesh.

When the hopper is in its operative position, the slot 76 is above the mouth of the seed spout 35, so that seed discharged from the hopper drop into said seed spout.

While I have in the above description disclosed what I believe to be a preferred and practical embodiment of the invention, it will be understood to those skilled in the art that the details of construction and the arrangement of parts are capable of some modification and rearrangement to meet the possible exigencies of use, without transcending the cooperation of the invention as defined in the appended claim.

What I claim as my invention is:

In a planter, a frame, vertical backwardly divergent surface leveling wings at the forward end of said frame, a traction wheel at the rear symmetrically located with respect to said wings, and a pair of longitudinally extending spaced skids at an intermediate point between said wings and said traction wheel, the lowermost portions of said wheel, said skids and said wings terminating approximately in a common plane, a guiding runner lying in a longitudinally vertical plane between said skids, extending below said skids and adjustable in a depth direction, the rear of said runner having backwardly divergent portions constituting a seed furrow opener, that part of said runner which is immediately anterior to said divergent portions extending depthwise below said divergent portions whereby it cuts a guiding groove for said planter below the bottom of the seed furrow, traction driven seed discharging hopper having a spout with the discharge end between said divergent portions, power transmission mechanism associated with said hopper and located directly beneath it, said hopper and transmission mechanism being directly above the guiding groove cutting portion of said runner, whereby the axis of rotation of said planter when its direction of orientation during travel is changed, will pass through said runner at a point adjacent said furrow opener and a pair of guiding handles extending rearwardly and upwardly from points on the frame adjacent said hopper.

PATRICK H. LYNCH, Sr.